United States Patent Office 3,414,485
Patented Dec. 3, 1968

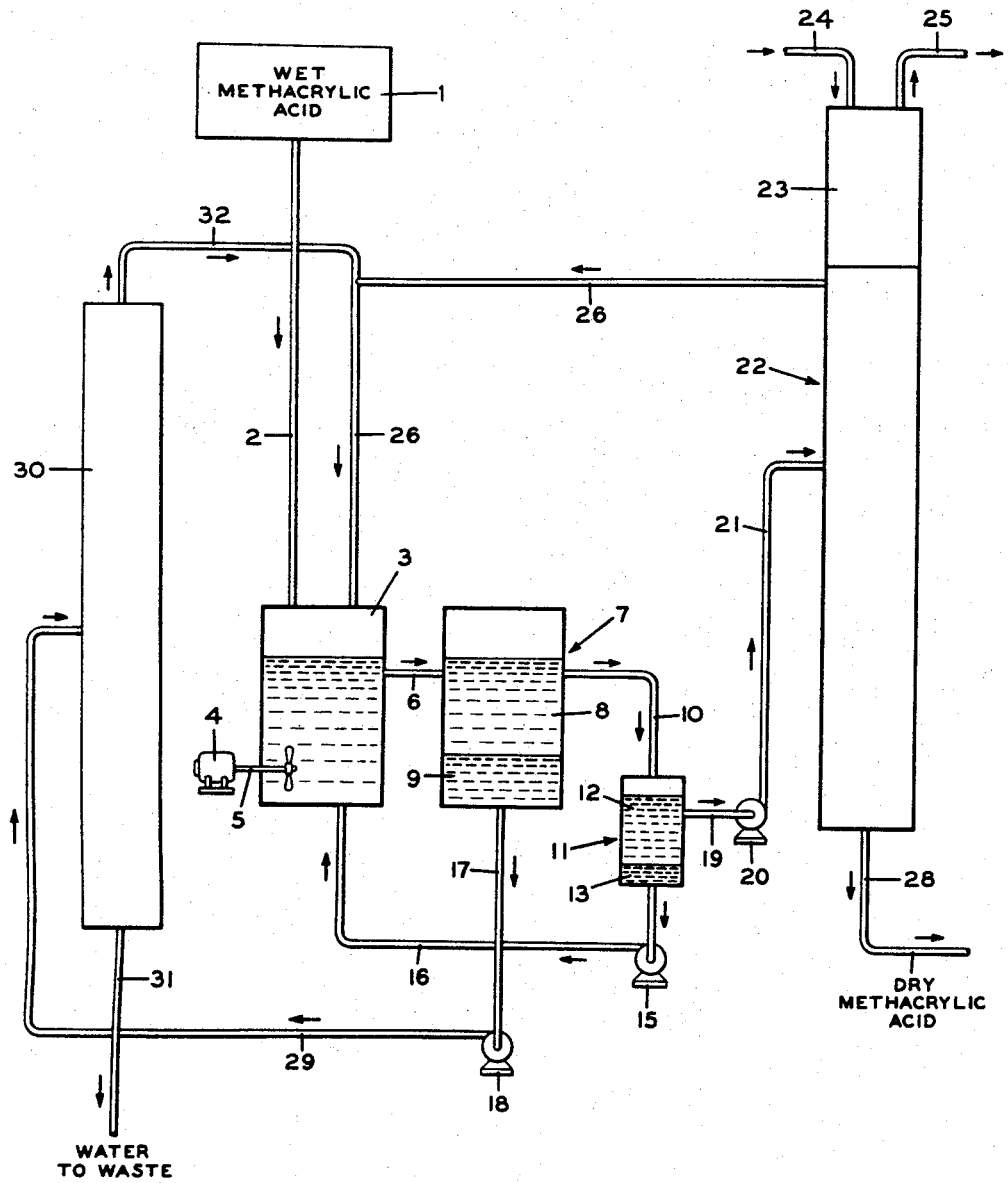

3,414,485
PROCESS FOR DRYING METHACRYLIC ACID BY EXTRACTION AND AZEOTROPIC DISTILLATION
George B. H. Speed, Pensacola, Fla., assignor to Escambia Chemical Corporation, Pace, Fla., a corporation of Delaware
Filed May 17, 1967, Ser. No. 639,236
12 Claims. (Cl. 203—43)

ABSTRACT OF THE DISCLOSURE

Water is removed from methacrylic acid in a two-stage process. In the first stage, the methacrylic acid, containing a significant amount of water, is extracted with an organic solvent which organic solvent is at most only slightly soluble in water and in which methacrylic acid is more soluble than in water, and which organic solvent forms a minimum-boiling azeotrope with water. After extraction, the aqueous layer and the organic solvent layer which form are separated and the organic solvent layer, containing methacrylic acid, is subjected in the second stage to azeotropic distillation at a reduced pressure thereby removing as a distillate the organic solvent and any residual amounts of water. The bottoms-product of the distillation is substantially dry methacrylic acid of high purity.

---

The present invention relates to a novel process for drying methacrylic acid. More specifically, the invention is concerned with a novel method for drying methacrylic acid to remove water which is present and yet avoid both polymerization of the methacrylic acid during the drying process and the difficulties which have hampered prior art drying methods.

Methacrylic acid and its lower esters are of great commercial importance due to their usefulness in a wide variety of applications. Since they possess the ability to polymerize quite readily one of their principal uses is in the preparation of homopolymers and of copolymers with various other polymerizable compounds. The homopolymers produced from methacrylic acid and its lower alkyl esters, particularly the methyl ester, find use in many applications because of their ease of being molded or cast into shapes, their high degree of clarity, light weight and strength.

To be useful in polymerization or to be economically converted to its esters, methacrylic acid monomer should be in a substantially dry state. Most processes of preparation of methacrylic acid produce water as a by-product and this must be removed from the methacrylic acid in order to store it or to use it in polymerization. As an example of the formation of water in the production of methacrylic acid, when alpha-hydroxyisobutyric acid is dehydrated by a catalytic process, such as disclosed in British Patent No. 852,664, the reaction products are methacrylic acid and one mole of water for each mole of methacrylic acid produced. Removal of these substantial amounts of water presents substantial difficulties. One cannot separate the methacrylic acid from the water by ordinary direct distillation due to the existence of a minimum-boiling azeotrope of methacrylic acid and water, containing about 15% methacrylic acid. Other methods of water removal such as freezing or salting out from aqueous solutions of the methacrylic acid are uneconomical, they do not accomplish sufficient separation of the water from the methacrylic acid, and they frequently produce methacrylic acid having a high degree of contamination with impurities. Furthermore, as applicant has found, even azeotropic distillation using an organic solvent which forms a minimum-boiling azeotrope wth water is not satisfactory for removal of the water because of the tendency of the methacrylic acid monomer to be polymerized during the distillation, even at reduced pressures and temperatures and thereby precipitate in and clog up the distillation column and other equipment. Not even the introduction of polymerization inhibitors prevents this difficulty.

It is, accordingly, an object of the present invention to overcome the disadvantages of the prior art methods for drying methacrylic acid.

It is an object of the present invention to provide a process for drying methacrylic acid.

It is a further object of the present invention to provide a novel and efficient, economical process for drying methacrylic acid to provide methacrylic acid which is substantially free of water, and without incurring any substantial polymerization of the methacrylic acid.

It is another object of the present invention to dry methacrylic acid by a process which permits recovery of all materials but undesirable impurities.

Other objects of the invention will be apparent to those skilled in the art from the description which follows, taken in conjunction with the appended drawing, in which the figure is a diagrammatic illustration or flow diagram of the process of the invention.

In accordance with the present invention, it has been discovered that methacrylic acid may be dried to effect removal of substantially all of the water and to produce a methacrylic acid which is more than 99% pure. The process of the invention employs a two-stage extraction-azeotropic distillation process whereby substantially no polymerization of the methacrylic acid takes place. In accordance with the present process, the crude methacrylic acid as produced, being dissolved in substantial amounts of water is first subjected to an extraction with an organic solvent which is no more than slightly soluble in water and which has a distribution coefficient favorable for the extraction of methacrylic acid from water. The organic solvent must also form a minimum-boiling azeotrope with water and must boil at a temperature lower than the boiling point of methacrylic acid. It should also, of course, be unreactive with methacrylic acid and water. The extraction step is conducted by mixing the organic solvent with the methacrylic acid containing the water and then permitting the organic solvent layer to separate from the water layer in a decanter or settling tank. The organic solvent layer containing the solvent, methacrylic acid and only minor amounts of water is then separated from the aqueous layer and subjected to distillation at a pressure less than atmospheric. In this distillation, the organic solvent, the residual amounts of water in the form of an azeotrope with the organic solvent, and only very minor amounts of methacrylic acid are removed as an overhead distillate. The bottoms constitutes substantially dry methacrylic acid of high purity.

The two-stage process is of the essence of the invention. It has been discovered that unless the extraction step is carried out prior to distillation with the organic solvent, serious amounts of polymerization will take place in the distillation column and in other process equipment, including storage vessels, regardless of whether a polymerization inhibitor is employed. The extraction step of the process tends to remove the methacrylic acid from water-soluble impurities which water-soluble impurities tend to initiate polymerization of the methacrylic acid, particularly when the methacrylic acid is heated even at only slightly elevated temperatures.

A particular advantage of the process of the present invention is that it permits the use of a single solvent for both the extraction step and for the distillation or entrainment step which follows. This is important because it requires no separate solvent purification, since the solvent is, in effect, substantially purified during the process of the invention for reuse in the process. Another important feature of the invention is the use of a solvent which forms a heterogeneous minimum-boiling azeotrope with water. This permits removal of both the solvent and the residual amounts of water from the methacrylic acid by simple distillation and permits purification of the methacrylic acid to a high degree of purity.

The requirements of the solvent employed in both the extraction and distillation steps of the process are:

(1) It must have a limited solubility in water and a distribution coefficient favorable to extract methacrylic acid from water.

(2) It must form a minimum-boiling azeotrope with water.

(3) It should boil at a temperature lower than the boiling point of methacrylic acid, so that it can be removed overhead in the distillation column where the final drying of the methacrylic acid takes place.

(4) It should be substantially unreactive with and chemically inert to methacrylic acid and water.

Desirably, the organic solvent should boil at a higher temperature than esters of methacrylic acid so that in the event that it is present should the methacrylic acid be subsequently esterified it can be separated as a bottoms product in the column where the final methacrylic acid ester is distilled overhead. However, this is not an essential requirement.

Among the organic solvents which may be satisfactorily employed are ortho, meta or para-xylene, toluene, n-octane, mono-chlorobenzene, methylamylketone, ligroin and methyl methacrylate monomer. Set forth in Table 1 below are the boiling points and characteristics of their azeotropes with water of a number of these organic solvents.

TABLE 1

| Organic solvent | Boiling point at atmospheric pressure, ° C. | Boiling point of azeotrope with water at atmospheric pressure, ° C. | Percent water in azeotrope |
| --- | --- | --- | --- |
| Methyl methacrylate | 100 | 83 | 14 |
| Toluene | 110 | 85 | 20 |
| n-Octane | 126 | 90 | 25.5 |
| Mono-chlorobenzene | 132 | 90 | 28 |
| m-Xylene | 139 | 94.5 | 40 |
| Methylamylketone | 150 | 95 | 45 |

Methacrylic acid monomer by comparison has a boiling point of 162° C. at atmospheric pressure, its azeotrope with water has a boiling point of 100° C. and the azeotrope with water contains about 86% water.

Of the organic solvents employed as the extractant and entraining agent in the distillation step, xylene is preferred. It has the advantages of being readily removed from the dried methacrylic acid and it is not difficult to condense in the distillation column at reduced pressure. Xylene-water azeotrope boils at about 39° C. at 80 mm. of mercury absolute pressure and it is therefore possible to condense the azeotrope vapors without employing a refrigerated coolant. Methyl methacrylate monomer is less satisfactory than xylene, for although it presents no possibility of contamination when the methacrylic acid is subsequently esterified to the methyl ester, its azeotrope with water boils at 29° C. at 80 mm. of mercury absolute pressure and it is therefore difficult to condense unless a refrigerated coolant is used in the distillation condenser. Additionally, methyl methacrylate monomer is substantially more expensive than xylene.

The process of the invention will be described in conjunction with the flow diagram of the figure of the drawing. As shown in the figure wet methacrylic acid 1 is carried through pipe 2 to extractor 3. Optionally, but preferably, the wet methacrylic acid is first subjected to a preliminary distillation at atmospheric pressure or sub-atmospheric pressures at a bottoms temperature which preferably does not exceed about 150° C., in a distillation column (not shown) where the very small amount of very low boiling impurities are removed as overhead. Higher temperatures may tend to initiate unwanted polymerization. These very low boiling impurities, when the methacrylic acid is produced by dehydrating alpha-hydroxyisobutyric acid, typically consist of acetone, nitromethane, carbon dioxide and possibly others such as other organic nitration products. The bottoms of this preliminary distillation is homogeneous and constitutes substantially all of the starting material. In extractor 3, xylene is added through pipe 26 along with small amounts of water and mixed by the agitator 5 powered by the motor 4. The mixture is carried through pipe 6 to decanter or settling tank 7 where it separates into an upper organic layer 8 and a lower aqueous layer 9. In place of extractor 3 and decanter 7, one may employ an extraction machine or column. The organic layer 8 is transferred through pipe 10 to another decanter 11 where the liquid layer separates into another upper organic layer 12 and another aqueous layer 13, the latter being small in amount and which is pumped from decanter 11 through pump 15 through pipe 16 to return to extractor 3.

Second decanter 11 is employed as a precaution. If the first decanter 7 effects satisfactory separation, it is not necessary to employ second decanter 11.

The organic layer 12 is then pumped through pipe 19 by pump 20 into pipe 21 into distillation column 22. The distillation column 22 is equipped with an internal condenser 23 supplied with a coolant liquid at 24 which leaves the system at 25. The overhead, consisting primarily of xylene and a minimum-boiling azeotrope with water, with very small amounts of methacrylic acid, is removed upon condensing through pipe 26 and returned to extractor 3. The bottoms, which is substantially dry methacrylic acid of a purity in excess of 99%, is removed from the distillation column through pipe 28 for storage and possible subsequent esterification to produce methyl methacrylate. The distillation in column 22 is carried out at a pressure not exceeding atmospheric pressure. This permits distillation at reduced temperatures, thereby minimizing polymerization or decomposition of the methacrylic acid. Preferred pressures are between about 30 mm. and 760 mm. of mercury absolute pressure. Preferred results may be obtained at a pressure of between about 50 mm. and 500 mm., such as about 80 mm. Hg. The lower the pressure, the lower the temperature permitted.

The aqueous layer 9 is removed from decanter 7 through pipe 17 by pump 18 and carried by pipe 29 into stripping column 30, where the material is subjected to the action of live steam which boils out any contained organic solvent or methacrylic acid as an overhead and removed from column 30 through pipes 32 and 26 to be returned to extractor 3. The water is removed from the system through pipe 31 to go to waste. Contained with the water are water-soluble impurities, among them polymerization initiators. When the methacrylic acid is produced from catalytic dehydration of alpha-hydroxyisobutyric acid, the water-soluble impurities include acetic acid and alpha-hydroxyisobutyric acid. Alpha-hydroxyisobutyric acid produced by nitric acid oxidation may contain small amounts of nitric acid, which would be removed at this point with the water layer. The water-soluble impurities have been found to contain polymerization initiators for methacrylic acid. Thus their removal from the methacrylic acid prior to final distillation is highly desirable.

The stripping column is desirably operated at atmospheric pressure, since no advantage is obtained by elevated or reduced pressures, but they may be used.

The process of the invention may be carried out either continuously or batch-wise.

In order more clearly to disclose the nature of the present invention, specific examples of the practice of the invention are hereinafter given. It should be understood, however, that this is done by way of example and is intended neither to delineate the scope of the invention nor limit the ambit of the appended claims. Parts are expressed in terms of parts by weight, unless otherwise stated.

EXAMPLE 1

The procedure of this example will be described in conjunction with FIG. 1 of the drawings. An aqueous solution of methacrylic acid monomer, produced by the catalytic dehydration of alpha-hydroxyisobutyric acid was subjected to an initial distillation (not shown) at a pressure of about one atmosphere, and at about 100° C. bottoms temperature, to remove very small amounts of highly volatile products such as nitromethane, acetone and carbon dioxide. The bottoms was then conducted through pipe 2 into extractor 3. The feed of the extractor 3 contained about 55% methacrylic acid, 43% water and small amounts of water-soluble impurities. Through pipe 26 was introduced sufficient xylene and water from the overhead of distillation column 22 so that the methacrylic acid content of extractor 3 was less than 77%. With xylene, the methacrylic acid content should not exceed 77%, since amounts in excess of 77% produce homogeneous single phase compositions. When the amount of methacrylic acid is less than 77%, the mixture separates into aqueous and non-aqueous phases. After thorough agitation by the agitator 5 driven by motor 4, the contents were transferred through pipe 6 into decanter 7 where the contents separated into an upper xylene layer 8 and a lower water layer 9. The xylene layer 8 was conducted through pipe 10 into another decanter 11 where a little additional water layer 13 settled out and from which the xylene 12 was pumped through pipe 19 by pump 20 through pipe 21 into distillation column 22. At this stage the feed carried through pipe 21 contained 55% xylene, 44% methacrylic acid and 1% water. The distillate or overhead was removed from distillation column 22 through pipe 26 and returned to extractor 3. The overhead at this stage contained 5% methacrylic acid, 2% water and 93% xylene. The bottoms removed through pipe 28 was substantially dry methacrylic acid in excess of 99% purity. In the column 22 the pressure head was held at about 80 mm. of mercury absolute pressure and the head temperature was 52° C. This temperature can be permitted to run as high as 82° C., if the methacrylic acid is allowed to recycle.

The water layer 9 in decanter 7 was transferred through pipe 17 by pump 18 into pipe 29 into stripping column 30. This aqueous composition consisted of 95% water, 4% methacrylic acid and traces of xylene and impurities. The stripping column was operated at atmospheric pressure to remove the methacrylic acid and traces of xylene and impurities as an overhead through pipe 32 into pipe 26 and return to extractor 3. The bottoms, constituting substantially water with small amounts of acetic acid, alpha-hydroxyisobutyric acid and other water-soluble impurities was withdrawn through pipe 31 to go to waste.

As will be appreciated by those skilled in the art from the foregoing teachings, the xylene in the foregoing example can be replaced by one of the other organic solvents disclosed herein, such as methyl methacrylate monomer, toluene, octane, chlorobenzene, methylamylketone and ligroin, etc.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:
1. A process for drying methacrylic acid from its aqueous solutions comprising:
  (a) feeding to a first chamber an aqueous solution of methacrylic acid and an organic solvent, which solvent is at most only slightly soluble in water and in which methacrylic acid is more soluble than is water, said organic solvent forming a minimum boiling azeotrope with water and boiling at a temperature lower than the boiling point of methacrylic acid;
  (b) extracting the methacrylic acid from the aqueous solution with the organic solvent by agitation;
  (c) feeding the mixture formed in step (b) to a second chamber;
  (d) separating the mixture in the second chamber into a first organic layer and a first aqueous layer by settling;
  (e) recycling the first aqueous layer to the first chamber;
  (f) feeding the first organic layer to a distillation column;
  (g) azeotropically distilling the first organic layer in the distillation column to form an overhead comprising the organic solvent and water and a bottoms of substantially dry methacrylic acid;
  (h) condensing the overhead of the distillation column;
  (i) recycling the condensed overhead stream to the first chamber and
  (j) recovering the dry methacrylic acid.
2. The process for drying methacrylic acid according to claim 1 wherein the organic solvent is a member selected from the class consisting of xylene, methyl methacrylate monomer, toluene, octane, ligroin, chlorobenzene and methylamylketone.
3. The process for drying methacrylic acid according to claim 1 wherein the organic solvent is xylene.
4. The process for drying methacrylic acid according to claim 1 wherein the organic solvent is methyl methacrylate monomer.
5. The process for drying methacrylic acid according to claim 1 wherein the organic solvent is toluene.
6. The process for drying methacrylic acid according to claim 1 wherein the distillation is conducted at a pressure less than atmospheric.
7. The process for drying methacrylic acid according to claim 1 wherein the distillation is conducted at a pressure of between about 30 mm. and 760 mm. of mercury absolute pressure.
8. The process for drying methacrylic acid according to claim 1 wherein the distillation is conducted at a pressure of about 80 mm. of mercury absolute pressure.
9. The process for drying methacrylic acid according to claim 1 wherein the aqueous solution of methacrylic acid is first subjected to an initial distillation to remove highly volatile impurities prior to subjecting said solution to extraction with the organic solvent.
10. The process for drying methacrylic acid according to claim 1 wherein the organic solvent is substantially insoluble in water.
11. The process for drying methacrylic acid according to claim 14 wherein the recycle of step (e) is steam stripped with the overhead of the stripper, containing remaining solvent and methacrylic acid, being recycled to the first chamber and the bottoms, consisting essentially of water, being directed to waste.
12. A process for drying methacrylic acid from the aqueous solution comprising:
  (a) feeding to an extractor the aqueous solution and a recycled organic solvent, which solvent is at most only slightly soluble in water and in which methacrylic acid is more soluble than is water, said organic solvent forming a minimum boiling azeotrope with water and boiling at a temperature lower than the boiling point of methacrylic acid;
  (b) extracting in a first chamber the methacrylic acid from the aqueous solution with the organic solvent by agitation;

(c) feeding the mixture formed in step (b) to a second chamber;

(d) separating the mixture in the second chamber into a first organic layer and a first aqueous layer by settling;

(e) feeding the first organic layer to a third chamber;

(f) separating the first organic layer in the third chamber into a second organic layer and a second aqueous layer by settling;

(g) feeding the first aqueous layer as a stream to a stripping column;

(h) steam stripping the first aqueous layer stream to form an overhead of remaining solvent and methacrylic acid and a bottoms of water;

(i) recycling the stripping column overhead to the first chamber;

(j) directing the stripping column bottoms to waste;

(k) recycling the second aqueous layer to the first chamber;

(m) decanting and feeding the second organic layer as a stream to a distillation column;

(n) azeotropically distilling the second organic layer stream in the distillation column to form an overhead comprising the organic solvent and water and a bottoms of substantially dry methacrylic acid;

(o) condensing the overhead of the distillation column;

(p) recycling the condensed overhead stream from the distillation column to the first chamber; and (q) recovering the dry methacrylic acid.

References Cited

UNITED STATES PATENTS

| | | | |
|---|---|---|---|
| 1,668,380 | 5/1928 | Ricard | 203—15 |
| 1,915,002 | 6/1933 | Ricard et al. | 203—15 |
| 2,266,004 | 12/1941 | Coes | 203—15 |
| 2,922,815 | 1/1960 | Faerber | 203—62 |
| 3,337,740 | 8/1967 | Gray et al. | 260—562 |
| 3,344,178 | 9/1967 | Brown et al. | 203—15 |

FOREIGN PATENTS

| | | |
|---|---|---|
| 650,343 | 2/1951 | Great Britain. |
| 997,325 | 7/1965 | Great Britain. |

WILBUR L. BASCOMB, JR., *Primary Examiner.*

UNITED STATES PATENT OFFICE
CERTIFICATE OF CORRECTION

Patent No. 3,414,485

December 3, 1968

George B. H. Speed

It is certified that error appears in the above identified patent and that said Letters Patent are hereby corrected as shown below:

Column 6, line 61, claim reference numeral "14" should read -- 1 --.

Signed and sealed this 10th day of March 1970.

(SEAL)
Attest:

Edward M. Fletcher, Jr.
Attesting Officer

WILLIAM E. SCHUYLER, JR.
Commissioner of Patents